US005887653A

United States Patent [19]
Bishop et al.

[11] Patent Number: 5,887,653
[45] Date of Patent: Mar. 30, 1999

[54] METHOD FOR CLAY STABILIZATION

[75] Inventors: L. W. Bishop; Marlin D. Holtmyer, both of Duncan, Okla.

[73] Assignee: Plainsman Technology, Inc., Marlow, Okla.

[21] Appl. No.: 911,757

[22] Filed: Aug. 15, 1997

[51] Int. Cl.$^6$ ............................ E21B 43/22; E21B 43/26
[52] U.S. Cl. ...................... 166/281; 166/294; 166/305.1; 106/900; 405/264; 507/129; 507/240; 507/922
[58] Field of Search ..................................... 166/281, 294, 166/300, 305.1, 308; 106/900; 405/264; 507/129, 240, 922

[56] References Cited

U.S. PATENT DOCUMENTS

| | | | |
|---|---|---|---|
| 2,623,901 | 12/1952 | Klein | 260/567.6 |
| 2,774,759 | 12/1956 | Blackett | 260/251.5 |
| 3,349,032 | 10/1967 | Krieg | 166/275 |
| 4,462,718 | 7/1984 | McLaughlin et al. | 405/464 |
| 4,842,073 | 6/1989 | Himes et al. | 166/294 |
| 4,974,678 | 12/1990 | Himes et al. | 166/308 |
| 4,977,962 | 12/1990 | Himes et al. | 166/305.1 |
| 5,089,151 | 2/1992 | Hall et al. | |
| 5,097,904 | 3/1992 | Himes | 166/294 |
| 5,197,544 | 3/1993 | Himes | 166/294 |
| 5,211,239 | 5/1993 | Thomas et al. | 166/308 |
| 5,232,497 | 8/1993 | Dillenbeck et al. | 166/294 X |
| 5,380,706 | 1/1995 | Himes et al. | 507/129 |
| 5,424,284 | 6/1995 | Patel et al. | 507/129 |
| 5,635,458 | 6/1997 | Lee | 507/240 |

OTHER PUBLICATIONS

Tests Show Organic Clay Stabilizers Prevent Permeability Loss. Behenna, Sep. 12, 1994, p. 3.

*Primary Examiner*—George Suchfield
*Attorney, Agent, or Firm*—Thomas R. Weaver

[57] ABSTRACT

There is provided an additive for and a method of using the additive to treat a clay-containing earthen formation, such as a subterranean formation, to substantially reduce formation damage caused by contact of the formation with an aqueous liquid foreign to the formation. The additive, which is employed in a water solution, is comprised of a chloride-free, quaternary ammonium compound which can be used without adverse affect upon animal, soil and water resources due to the chloride-free and substantial organic nature thereof. It thus biodegrades to environmentally acceptable end products.

20 Claims, No Drawings

5,887,653

METHOD FOR CLAY STABILIZATION

BACKGROUND OF THE INVENTION

1. Technical Field of the Invention

This invention broadly relates to methods of and additives for treating earthen formations containing clays. The invention further relates to the treatment of subterranean clay-containina formations. The additive of this invention finds particular use in aqueous fluids employed to stimulate the production of fluids. such as hydrocarbons and water, from subterranean clay-containing formations.

2. Description of the Prior Art and Problems Solved

It is well known that earthen formations which contain clays can swell and become unstable if such formations are contacted with waters which are foreign to the formation. It is believed that any salts dissolved in such foreign waters enter into a cation exchange with charged sites existing on the clays and that a common result of this cation exchange is a chanae in the physical structure of the clay, wherein the change is evidenced by the previously mentioned swelling and/or instability.

When clay swells the ability of the clay-containing formation to transmit, that is, to permit the passage of a fluid, such as an aqueous liquid and/or a hydrocarbon liquid, through the formation pores is diminished because the swelling phenomenon reduces the permeability of the material. In certain situations, such as in earthen materials in water ponds and absorbants, wherein liquid transmissibility through the material is not a desired condition, reduced soil permeability is a desired result. However, in situations, such as in subterranean well formations. wherein the ability of a liquid to pass through the material is a desired condition, the obstruction or even an increased resistance to liquid flow through the earthen formation is not a desired result.

Accordingly, for purposes of this invention, the word "damage" and the phrase "formation damage" are employed to describe the effect on an earthen formation, and particularly on one which contains clay, caused by contact of the formation with an aqueous liquid, wherein the effect is manifested by an unwanted increase in the resistance of the formation to permit a liquid to pass through the formation. Clays in such formations are referred to herein as "swelling clays."

In one aspect, formation damage can operate to impede the flow of oil and gas from a subterranean formation into a borehole. As suggested above, clays and fines, when in an undisturbed condition, are stable, accordingly, any obstruction to the flow of hydrocarbons through the stable formation is a function of the natural condition of the formation itself. However, when these materials are placed in contact with an aqueous fluid that is not natural, that is, foreign, to the formation, the clays can swell and the fines can migrate through the capillary flow channels in the formation resulting in a reduction of formation permeability, which has been referred to herein as formation damage. Such damage can be caused by the very fluids employed to enhance, i.e., stimulate, the flow of fluid from the formation. For example, an aqueous based fracturing fluid, employed to make one or more fractures in a hydrocarbon bearing formation to thereby increase the effective permeability of the formation, can, in fact, cause the effective permeability of the formation to decline, if the aqueous base of the fluid causes formation damage. The results of the fracture treatment could, therefore, be unsatisfactory.

Attempts have been made to prevent, or at least to reduce the damaging effects of foreign aqueous fluids upon subterranean formations. Some such attempts have featured dissolving various salts in the aqueous fluids utilized in the treatment of subterranean formations whereby clays contained in the formations, upon contact with the dissolved salts, are converted from a swelling form to a less swelling form. In this regard inorganic salts, such as potassium chloride, sodium chloride, and ammonium chloride, have been dissolved in an aqueous fluid utilized to treat a formation to produce the mentioned conversion. It is believed that the dissolved salts enter into a cation exchange with the charged clay particles to thereby convert the clays from a swelling form to a nonswelling form. While these salts can, and often do, prevent, or at least reduce. damage caused by foreign water on a formation, they can interfere with the desired performance of other constituents of the treatment fluid. For example, salts, which are typically dissolved in an aqueous fluid before admixture with any viscosifyina or gelling agents, can cause a reduction in expected viscosity increase upon the hydration of the gelling agent in the aqueous fluid.

Furthermore, such salts and particularly those containing chloride ions are encountering environmental objections and are therefore preferably to be avoided.

In another aspect, road beds comprised of clay-containing earthen materials are often treated with lime, a potential environmental hazard, to prevent swelling in the presence of water to thereby stabilize the clays to help maintain the structural integrity of roads constructed on clay base materials.

Accordingly, it would be desirable to provide an environmentally acceptable method and additive whereby damage caused by an aqueous treating fluid to an earthen formation, such as a subterranean formation, can be prevented or reduced, wherein the treating fluid can be prepared simply and can be employed without detrimental effects to fluid constituents.

SUMMARY OF THE INVENTION

By this invention there is thus provided a composition for and a method of using the composition to treat an earthen formation containing a swelling clay comprising contacting the formation with an aqueous fluid having dissolved therein an additive which functions to eliminate or reduce the tendency of the clay to swell upon contact thereof with a foreign aqueous fluid. It is believed that the additive of this invention contains a moiety which enters into a cation exchange with constituents of the clay, as previously described, to eliminate or reduce the tendency of the clay to swell. It is also believed that the additive includes no ingredients which, by themselves, are harmful to the environment. Accordingly, particular steps required to prevent environmental contamination are not required in the practice of the method of the invention.

It has been discovered that the treatment of an earthen formation to render it nonswelling can be of either a temporary or a substantially permanent nature depending on the quantity of additive employed to treat the formation.

The composition of this invention, wnich is useful to treat an earthen formation containing swelling clays, is an aqueous solution comprising the additive of this invention dissolved in an aqueous liquid wherein the additive is selected from certain chloride-free, quaternary ammonium compounds used either alone or in combination with a second compound, referred to herein as an enhancer. Thus, in accordance with this invention, the term additive includes the chloride-free, quaternary ammonium compounds described below as well as mixtures thereof with an enhancer.

The quaternary ammonium compounds of this invention are those within the scope of the formula:

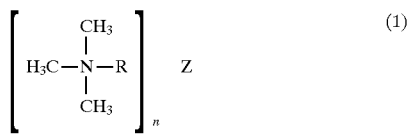

wherein, R is within the scope of the formula:

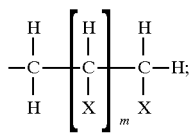

Z is selected from the group consisting of $CO_3$ and $HCO_3$; X is selected from the group consisting of H, OH and mixtures thereof, wherein at least one X is OH; m is 0 or 1; and n is 1 or 2. When m is zero, X is OH. When n is 1, Z is $HCO_3$ and when n is 2, Z is $CO_3$. It is noted that positive and negative charges for the cation and anion portions of Equation (1) are not indicated. Those persons skilled in the art will know the correct charge from the context and definition provided above.

The aqueous fluid can have a range of pH values extending from acidic to basic. The formation treatment can be for the purpose of enhancing the recovery of fluids from the formation such as by a fracture stimulation treatment and/or an acid stimulation treatment.

In one preferred embodiment, the aqueous fluid can be a fluid containing a gelling agent which increases the viscosity of the fluid.

A formation treatment performed for the purpose of enhancing the recovery of fluids, such as oil or gas, from the formation at least partially depends for success upon increasing the effective permeability of the formation. If the treating fluid itself tends to damage the formation by decreasing the permeability thereof then steps must be taken to reduce or substantially eliminate such damage.

The problem of reducing, or substantially eliminating, the damaging effect of an aqueous fluid upon a clay-containing subterranean formation was specifically addressed in U.S. Pat. Nos. 4,842,073 and 5,097,904 to Himes, et. al. and U.S. Pat. No. 5,089,151 to Hall et al., each of which discloses the addition to the aqueous fluid of specified quaternary ammonium compounds to prevent clay swelling and to thus reduce or to substantially eliminate damage to the formation caused by the aqueous fluid.

The quaternary ammonium compounds disclosed by Himes and referred to as formation control additives, consist of specified quaternary ammonium cations and, principally, halide, as well as other disclosed, inorganic anions. These formation control additives act to reduce or eliminate the decrease in the permeability of clay-containing formations contacted by an aqueous fluid. The phrase, formation damage, and similar such descriptions utilized by Himes and also as used in this invention, refer to the decrease in the permeability of a clay-containing formation caused by contact thereof with an aqueous fluid.

This invention provides compositions comprised of additives dissolved in aqueous fluids in amounts effective to minimize permeability damage to clay-containing formations contacted by the aqueous fluids. The amount of additive employed can be selected to provide a treatment result which is substantially permanent or substantially temporary in nature. In this connection, it is believed to be desirable to permit a subsurface formation, upon being contacted by connate fluids after the treatment with the foreign aqueous fluid is completed, to return to the natural, that is, the connate, condition so that natural fluids in the formation sought to be recovered will not be influenced in any substantially adverse fashion by the treatment result produced by the additives of this invention. Accordingly, the quantity of additive employed in the composition can be selected so that the treatment is substantially temporary. Of course, the quantity of additive employed can be selected so that the treatment can be of a substantially permanent nature as may be the case in various construction applications.

The additives of this invention, are liquid phase compounds. are easily handled by conventional equipment and are readily soluble in useful quantities in aqueous fluids used in conventional formation treating and stimulation procedures. The additives are not known to interfere with the function of other compounds known to be useful in aqueous treating fluids, for example, gelling agents.

In addition to the above benefits, and in another aspect of this invention, it is believed that certain of the additives employed herein can be used without adverse affect upon animal, soil and water resources because they are chloride-free and substantially organic in nature and thus biodegrade to environmentally acceptable end products.

DESCRIPTION OF THE PREFERRED EMBODIMENT

The composition of this invention comprises an additive dissolved in an aqueous fluid wherein the additive is selected from the group consisting solely of a first compound and mixtures of the first compound with a second compound. The first compound is selected from certain chloride-free, quaternary ammonium compounds. The second compound, referred to herein as an enhancer, is selected from salts consisting of alkali metal and ammonium cations and carbonate, bicarbonate and halide anions. Thus, in accordance with this invention, the term additive includes the chloride-free, quaternary ammonium compounds described below as well as mixtures thereof with an enhancer.

The quaternary ammonium compounds of this invention include those within the scope of the formula:

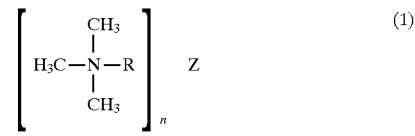

wherein, R is within the scope of the formula:

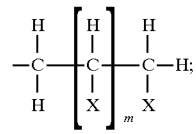

Z is selected from the group consisting of $CO_3$ and $HCO_3$; X is selected from the group consisting of H, OH and mixtures thereof, wherein at least one X is OH; m is 0 or 1; and n is 1 or 2. When m is 0, X is OH. When n is 1, Z is $HCO_3$ and when n is 2, Z is $CO_3$. In one preferred embodiment n is 1 and m is 0. It is noted that positive and negative charges for the cation and anion portions of Equation (1) are not indicated. Those persons skilled in the art will know the correct charge from the context and definition provided above.

Quaternary ammonium compounds useful herein which are within the scope of Equation (1), above, include (2-hydroxyethyl) trimethyl ammonium bicarbonate, (2-hydroxypropyl)trimethyl ammonium bicarbonate, (3-hydroxypropyl)trimethyl ammonium bicarbonate and (2,3-dihydroxypropyl)trimethyl ammonium bicarbonate wherein (2-hydroxyethyl)trimethyl ammonium bicarbonate is preferred.

The second compound, the enhancer, of this invention includes compounds within the scope of the formula:

$$B_d F \qquad (2)$$

wherein, B is $NH_4$, K and Na; F is $CO_3$, $HCO_3$ and Cl; and d is 1 or 2. When d is 1, F is $HCO_3$ or Cl. When d is 2, F is $CO_3$. In one preferred embodiment d is 1 and F is $HCO_3$. It is noted that positive and negative charges for the cation and anion portions of Equation (2) are not indicated. Those persons skilled in the art will know the correct charge from the context and definition provided above.

The enhancer compounds useful herein which are within the scope of Equation (2), above include potassium bicarbonate, sodium bicarbonate, ammonium chloride, ammonium carbonate and ammonium bicarbonate wherein ammonium bicarbonate is preferred.

The additive of this invention, which, as previously mentioned, consists essentially of a quaternary ammonium compound, as above defined, either alone or blended with an enhancer compound, is admixed with an aqueous liquid to form the composition of this invention, wherein the quantity of additive admixed with the aqueous liquid is an amount effective to substantially stabilize a clay-containing formation against permeability reduction as a result of contact between the formation and the fluid. An effective amount of the additive is believed to be an amount in the range of from about 0.004 to about 0.4, preferably from about 0.008 to about 0.2, and still more preferably from about 0.06 to about 0.1 percent additive by weight of the solution of the additive and aqueous liquid. The most preferred additive concentration to obtain a treatment result which is substantially temporary in nature is about 0.08 percent additive by weight of solution. In general, additive concentrations greater than about 0.08 percent provide treatment results which tend to be more permanent in nature, while additive concentrations less than about 0.08 percent provide treatment results which tend to be more temporary in nature.

The ratio of the weight of the second compound to the weight of the first compound in the additive of this invention, such ratio being referred to herein as the enhancement ratio, RE, is a dimensionless number in the range from about 0 to about 0.2, preferably from 0.01 to 0.15 and still more preferably about 0.1 parts by weight of the second compound per 1 part by weight of the first compound.

It is noted that the enhancement ratio can influence the additive concentration, as set above, with regard to the permanent or temporary nature of the treatment effect. Accordingly, laboratory testing on specific blends for specific results is encouraged.

In one preferred embodiment, the additive of this invention comprises ammonium bicarbonate, as the second compound, blended with (2-hydroxyethyl)trimethyl ammonium bicarbonate, as the first compound, in a ratio of 0.1 parts by weight of the second compound per 1 part by weight of the first compound to thereby form the additive of this invention which is then mixed with water to form an aqueous composition having 0.079 percent additive by weight of the aqueous composition.

Hydraulic fracturing is well known as a method for stimulating the flow of fluids, such as oil or gas, from a subterranean formation. According to the method, a subterranean formation is contacted by a fluid at a flow rate and pressure at least sufficient to create or extend a fracture into a desired portion of the formation. The fracturing fluid normally contains a proppant which is transported into the fracture to prevent the fracture from completely closing once pressure is released. Various fluids have been utilized in hydraulic fracturing, however, most fluids in current use are aqueous-based liquids.

A fracturing fluid can be prepared by admixing a quantity of a solvatable polysaccharide gelling agent with an aqueous liquid. Solvatable polysaccharides include galactomannan gums. glucomannan gums, cellulose derivatives and the like. The fracturing fluid may also include a crosslinking agent for the gelling agents as well as other additives. For example, the fluid can contain bactericides, gel breakers, iron control agents, foaming agents such as surfactants, gases or liquified gases, stabilizers and the like. The preparation of fracturing fluids and the use of various additives therein are well known to individuals of ordinary skill in the art. The selection of the particular fracturing fluid constituents such as the gelling agent, crosslinking agent, breaker, stabilizer and the like is not critical to the successful operation of the additive of this invention.

Aqueous fracturing fluids can include formation stabilization additives, such as the additive of this invention. Formation stabilization additives utilized have been water soluble inorganic salts such as potassium chloride, ammonium chloride, sodium chloride and calcium chloride. As previously indicated these salts can be difficult to use and can have detrimental effects upon certain properties of the gelled fluid such as reducing the viscosity produced by a gelling agent in the aqueous fluid in comparison to the viscosity produced by the gelling agent in fresh water. Furthermore, chloride containing compounds oftentimes are not environmentally acceptable. These compounds have been utilized, however, because of the ion-exchange properties of the clays present in the subterranean formations to be treated and the ability of these chemicals to provide some degree of formation stabilization through ion-exchange with the clays.

Included among the clays which can be effectively treated in accordance with the present invention are clay minerals of the montmorillonite (smectite) group such as montmorillonite, saponite, nontronite, hectorite, and sauconite; the kaolin group such as kaolinite, nacrite, dickite, and halloysite; the hydrousmica group such as hydrobiotite, glauconite, illite and bramallite; the chlorite group such as chlorite and chamosite; clay minerals not belonging to the above groups such as vermiculite, attapulgite, and sepiolite, and mixed-layer varieties of the above minerals and groups. The clay content of the formations can be comprised substantially of a single species of clay mineral, or of several species, including the mixed layer types of clay. Clay minerals commonly encountered in subterranean formations which are subject to the difficulties herein noted and which can be treated effectively in accordance with the present invention are those selected from the montmorillonite group, hydrousmica group, chlorite group, kaolin group and mixed layer types. It will be understood that the clay formations treated in accordance with the invention need not be composed entirely of clay but may contain other mineral components associated therewith.

Clays can swell, disperse, disintegrate or otherwise become disrupted in the presence of foreign aqueous fluids. A clay which swells is not limited to expanding lattice-type clays but includes all those clays which can increase in bulk volume with or without dispersing, disintegrating or otherwise becoming disrupted when placed in contact with foreign aqueous solutions such as water, and certain brines. Certain clays can also disperse, disintegrate or otherwise become disrupted without swelling in the presence of foreign aqueous solutions such as water, certain brines, and emulsions containing water or certain brines. Some clay, in the presence of foreign aqueous solutions, will expand and be disrupted to the extent that they become unconsolidated and produce particles which migrate. Formations which consist largely of clay upon absorbing water in a confined space can develop pressures on the order of several thousands of pounds per square inch.

The clay materials defined above occur as minute, plate-like, tube-like and/or fiber-like particles having an extremely large surface area as compared to an equivalent quantity of a granular material such as sand. This combination of small size and large surface area results in a high surface energy with attendant unusual surface properties and extreme affinity for surface-active agents. The structure of some of these clays, for example, montmorillonite, can be pictured as a stack of sheet-like three-layer lattice units which are weakly bonded to each other and which are expanded in the "c" crystallographic direction by water or other substances which can penetrate between the sheets and separate them. The cation exchange capacity of montmorillonite is in the range of from about 90 to 130 milliequivalents per 100 grams of pure clay; that of illite is in the range of from about 20 to 40 milliequivalents; and that of kaolinite is in the range of from about 5 to 15 milliequivalents.

Clays include cations which occupy base-exchange positions or sites. A "base-exchange position or site" is defined as an area on the surface of a clay crystal which has associated with it an exchangeable cation. Cations generally found on a base-exchange position or site include sodium, potassium, calcium, magnesium, iron and hydrogen as well other types. These cations are believed to be held on the clay surface primarily by ionic forces.

Cations occupying the base-exchange sites on clay can be those originally present thereon or those placed thereon by liquids placed in contact therewith. Accordingly, the nature and concentration of ions in an aqueous liquid placed in contact with the clay can determine the cations occupying the base exchange sites. In most oil well formations the connate water associated there-with contains sodium as the predominate cation, with calcium, magnesium and other cations present in much smaller quantities. Since base-exchange positions on clay are occupied by cations, in many cases the cation will be sodium when connate waters are sodium containing. Unfortunately, however, as for example in the case of the sodium form of montmorillonite, these clay minerals swell in the presence of foreign water or certain brines and can, in some instances, exert pressures up to thousands of pounds per square inch. Thus, dependent upon the nature and amount of water absorbed, the clay can change to a rigid paste or a gelatinous mass, or if sufficient water is present, the clay can disperse completely into the aqueous phase.

The swelling or dispersion of clays can significantly reduce the permeability of a formation. The use of salts as formation control additives has not eliminated formation damage as a result of permeability reduction, but can reduce or minimize such damage.

The additive of this invention can be admixed with the aqueous fluid, such as an aqueous fracturing fluid, at any time prior to contact of the fluid with the subterranean formation. The additives of this invention are readily available as liquid solutions, therefore, they readily admix with the constituents of an aqueous fracturing fluid both prior to and subsequent to hydration of the gelling agent. The use of the additive of this invention is particularly advantageous in stimulation treatments performed with liquid gel concentrates such as for example those described in U.S. Pat. Nos. 4,312,675; 4,435,217; 3,894,880; 3,894,879; and 4,466,890.

The additive is effective in treating a subterranean formation when transported in an aqueous carrier fluid having either an acid, alkaline or neutral pH in the range of from about 1 to 11 without any significant detrimental effect upon the additive.

The additive can be admixed with the constituents of an aqueous liquid gel concentrate during its preparation whereupon the gel remains storage stable. The additive can be admixed with the gel concentrate when the gelled fluid is prepared by introduction of the additive into a mixing vessel or blender together with other fluid additives. The additive of this invention does not exhibit mixing problems associated with previously used salts and do not appear to have any significant detrimental effect upon the hydration or ultimate yield of the gelling agent utilized to prepare a gelled fluid such as a fracturing fluid.

EXAMPLES

The following examples demonstrate the ability of various compounds, referred to herein as clay control additives, to resist the reduction of the permeability of a formation containing clay upon contacting the formation with an aqueous fluid. As previously noted, reduction of formation permeability is referred to as formation damage and is characterized by clay swelling and/or fines migration. The examples shall not be considered as limitations upon the scope of the present invention, but are presented for illustration only. All quantities, proportions and percentages are by weight and were performed at room temperature unless otherwise indicated.

Various different chemicals and blends of chemicals were employed in the following examples. In this connection the chemicals employed are identified in the Tables by letter combinations which are not, in all cases, the chemical formula or chemical name. Table A, below, provides the key to the said letter combinations and the formulas and names.

TABLE A

| LETTER COMBINATION | CHEMICAL NAME | CHEMICAL FORMULA |
|---|---|---|
| AC | Ammonium Carbonate | $(NH_4)_2CO_3$ |
| ABC | Ammonium Bicarbonate | $NH_4HCO_3$ |
| NaCl | Sodium Chloride | NaCl |
| KBC | Potassium Bicarbonate | $KHCO_3$ |
| ACl | Ammonium Chloride | $NH_4Cl$ |
| KCl | Potassium Chloride | KCl |
| TMACl | Tetramethyl Ammonium Chloride | $(CH_3)_4NCl$ |
| ChBC | Choline Bicarbonate | $HOCH_2\ CH_2N(CH_3)_3HCO_3$ |
| ChCl | Choline Chloride | $HOCH_2\ CH_2N(CH_3)_3Cl$ |
| CaHx | Calcium Hydroxide | $Ca(OH)_2$ |
| NaBC | Sodium Bicarbonate | $NaHCO_3$ |
| NaC | Sodium Carbonate | $Na_2CO_3$ |

Example 1

Aqueous solutions of various chemical compounds were prepared and 5 grams of A.P.I. bentonite was added to each such solution. The resulting combination of solution and bentonite was thoroughly mixed for 5 minutes in a bladed Waring blender to thereby form a suspension of bentonite in solution. Accordingly, as shown in Table 1, below, the column headed by the word "additive" is the chemical compound or blend of chemical compounds employed in each solution.

It is noted that one suspension contained only deionized water and bentonite and is treated in Table 1 as a measurement standard or control. The additive in the control is thus identified as, "none" in Table 1.

It is believed that the principal treating effect on the formation is caused by the cation portion of each additive. Accordingly, each solution tested was formulated to provide a 0.1M cation solution of the additive in deionized water. Since some of the additives listed in TABLE 1 consist of two chemical components, the first listed component contains 0.09M cation and the second listed component contains 0.01M cation to thereby produce a total cation concentration of 0.1M. The weight of chemical components in grams, as shown in Table 1, provides the desired 0.1M concentration.

Each prepared suspension was tested to determine the time required for the suspension to travel in a radial direction through filter paper from a first location in the paper to a second location in the paper. The extent to which the bentonite was swollen by the solution is indicated by the time required for the suspension to travel in the filter paper from the first location to the second location, wherein the greater the extent of swelling and consequent flow restriction the longer the travel time.

The tests, referred to herein as filtration time tests, were performed with a model 1 Capillary Suction Time (CST) instrument fitted with a 1 cm orifice funnel and Whatman No. 17 chromatography paper. Accordingly, the above mentioned filtration time is sometimes called capillary suction time (CST). The CST instrument measures filtration time on sized filter paper using spaced electrodes attached to an automatic timer. CST instruments can be obtained from VENTURE INNOVATIONS, INC. of Lafayette, La. Thus, as liquid filtrate contacts a first set of electrodes, a timer is activated and measurement of filtration time begins. When the filtrate contacts a second electrode set, the timer is deactivated and the time required for the filtrate to traverse the distance from the first electrode set to the second electrode set is recorded as the filtration (CST) time. Filtration time was performed on two 5 ml samples of each suspension and the results averaged and reported in Table 1.

It was mentioned that liquids which swell the clay produce long filtration times. In this regard, it is believed that the damaged clays and dispersed fines form a filter cake which acts to impede the flow of filtrate. Accordingly, the greater the damage the more efficient the filter cake which results in longer filtration time. Conversely, travel times of short duration indicate little or no damage to clays, it is believed that additives which resist or prevent damage cause clay particles to flocculate to thereby prevent the formation of an efficient filter cake, resulting in a shorter filtration time.

The filtration time test results are provided in Table 1, below.

TABLE 1

CAPILLARY SUCTION TIME

| No. | Additive | Additive Amount grams per 100 ml | Filtration Time seconds |
| --- | --- | --- | --- |
| 1 | none | 0.00 | 10512 |
| 2 | AC | 0.48 | 1125 |
| 3 | ABC | 0.80 | 579 |
| 4 | NaCl | 0.60 | 526 |
| 5 | KBC | 1.00 | 513 |
| 6 | ACl | 0.54 | 431 |
| 7 | KCl | 0.76 | 205 |
| 8 | TMACl | 1.1 | 54 |
| 9 | ChBC | 1.65 | 44 |
| 10 | ChBC | 1.49 | 44 |
|  | AC | 0.05 |  |
| 11 | ChBC | 1.49 | 43 |
|  | ACl | 0.05 |  |
| 12 | ChBC | 1.49 | 40 |
|  | ABC | 0.08 |  |
| 13 | ChCl | 1.40 | 35 |
| 14 | ChCl | 1.26 | 34 |
|  | ABC | 0.08 |  |
| 15 | ChBC | 1.49 | 32 |
|  | KBC | 0.10 |  |

Referring to Table 1, it is seen that deionized water without additive, the control used in item 1, caused a great deal of damage to the bentonite, as evidenced by the filtration time which exceeded 2.9 hours. The additives employed in items 4, 6 and 7 have long been known to be useful to treat clay-containing formations and appear to have reduced formation damage, when compared to the control, by a factor in the range of from about 20 to about 51. The additives employed in items 8 and 13, which are disclosed in U.S. Pat. Nos. 4,842,073, 4,974,678, 5,089,151, 5,097,904 and 5,197,544 to be useful to treat clay-containing formations, appear to have reduced formation damage, when compared to the control, by a factor in the range of from about 195 to about 300. It is evident that the additives used in items 8 and 13 show a substantial improvement with respect to the additives employed in items 4, 6 and 7.

A compound preferred for use in this invention to prevent or diminish formation damage is shown item 9 as a single ingredient in a treating fluid and in combination with other compounds in items 10, 11, 12 and 15. It is seen that the compound in item 9, which is referred to herein as choline bicarbonate, and also as (2-hydroxyethyl)trimethyl ammonium bicarbonate, provides a degree of formation protection, whether alone or in combination with the other compounds shown, which is at least equal to the protection afforded by the prior art compounds mentioned above. Furthermore, the uses and various advantages cited in U.S. Pat. Nos. 4,842,073, 4,974,678, 5,089,151, 5,097,904 and 5,197,544 for the materials identified in items 8 and 13 apply to the compounds and mixtures of compounds of this invention.

Note the combinations of compounds employed in items 10, 11, 12 and 15. In each case the combination provided an unpredictable and surprising result superior to the result provided by any compound in the combination when acting alone.

Further note the compounds employed in items 9, 10, 12 and 15 are chloride-free and are considered to be substantially organic in nature. These compounds are readily biodegradable and enjoy a greater environmental acceptance than compounds which are not chloride-free and which are not substantially organic in nature.

Examples 2 and 3

Examples 2 and 3 illustrate the effect of a treating fluid on the ability of an earthen structure to permit the passage of a liquid through the structure. The procedure employed, as set out below, features passing an aqueous sodium chloride solution through the structure immediately before and immediately after passing a treating fluid through the structure.

The time required for a first quantity of an aqueous sodium chloride solution to pass through the structure was recorded and a first flow rate, Q1, was calculated by dividing the first quantity of solution by the recorded time.

A given quantity of aqueous treating fluid was then passed through the structure.

The time required for a second quantity of an aqueous sodium chloride solution to pass through the structure was recorded and a second flow rate, Q2, was calculated by dividing the second quantity of solution by the recorded time, wherein the second quantity of aqueous sodium chloride solution was equal in concentration and quantity to the first quantity of aqueous sodium chloride solution.

The first flow rate, Q1, was compared with the second flow rate, Q2, to determine the treating value, RQ. wherein:

$$RQ=(Q1-Q2)/Q1$$

With regard to the interpretation of the results, if the ssecond flow rate, Q2, is equal to or greater than the first flow rate, Q1, then it is concluded that the treating fluid has no influence on the ability of the structure to impede the passage of the solution. If the second flow rate, Q2, is zero, then it is concluded that the treating fluid has a great deal of influence on the ability of the structure to impede the passage of the solution and, in fact, completely destroyed the ability of the structure to permit passage of the solution.

Accordingly, the value of Q2 as compared to the value of Q1 is an indication of the effect of the treating fluid to cause the structure to resist passage of a liquid. For example, if Q2 is equal to Q1, then RQ is equal to 0, which indicates that the treating fluid has no influence on the ability of the structure to impede the passage of a liquid therethrough. If Q2 is equal to 0, then RQ is equal to 1, which indicates that the treating fluid has a great deal of influence on the ability of the structure to impede the passage of the solution and, in fact, has destroyed the ability of the structure to permit passage of the liquid therethrough. It is preferred that the treating value, RQ, have a value in the range of from 0 to 0.8, and still further preferred that the treating value be in the range of from about 0.4 to about 0.6.

While the procedure described above, wherein RQ is determined, is an indication of the effect of the treating fluid on the ability of the structure to permit the passage of a liquid through the structure, it is not a definite indication of the temporary or permanent nature of the effect. The temporary or permanent nature of the treatment is examined by determining whether deionized water can change the effect of the treating fluid on the structure.

Accordingly, deionized, D.I., water was passed through the structure after the second quantity of the aqueous sodium chloride solution was passed through the structure. Thus, D.I. water was permitted to pass through the structure for 25 minutes. The quantity of water which passed through the structure in the first minute was recorded and was, thus, flow rate q1. The quantity of water which passed through the structure in the entire 25 minute period was recorded and then divided by 25 to obtain the second flow rate, q2.

The first flow rate, q1, was compared with the second flow rate, q2, to determine the permanency value, Rq, wherein:

$$Rq=(q1-q2)/q1$$

With regard to the interpretation of the results, if q2 is equal to q1, then it is concluded that the deionized water did not change the effect of the treating fluid on the structure, and that the treatment is permanent. However, if q2 is less than q1, then it is concluded that the deionized water did change the effect of treating fluid on the structure and that the treatment is not permanent.

Thus, if q2 approaches zero, then Rq approaches 1, and the treatment is considered to be temporary, wherein the larger the value of Rq the more temporary is the treatment. If q2 is equal to q1, then Rq is equal to 0, and the treatment is considered to be permanent. Thus, the smaller the permanency value, Rq, the more permanent is the treatment.

In the above examination since q1 is always greater than 0, it follows that q2 is always greater than 0, but q2 can be very small and thus approach zero. Therefore, the theoretical permanency value, Rq, has a value in the range of from 0 to less than 1. However, particularly for well treatment operations, it is preferred that the result produced by the treatment fluid be more temporary than permanent. Accordingly, it is preferred that Rq be equal to or greater than 0.5, and still further preferred that the permanency value be in the range of from about 0.5 to about 0.75.

EXAMPLE 2

Liquids were passed through a clay-containing mixture, referred to herein as a "sand column", maintained in a vertically disposed, pressurized plexiglass tube having a one-inch inside diameter, a closed top and a closed bottom. The top of the tube was equipped to enable the introduction of liquid and gas into the interior thereof and for the maintenance of a uniform gas pressure therein. The bottom of the tube was equipped with a screen having a mesh of sufficiently small size to prevent the passage of solids, but not of liquids, therethrough; a rubber plug in contact with said screen having an axial hole drilled completely therethrough: and a bottom valve having an elongated hollow tubular stem upstream of said valve fitted into and maintained by friction in said axial hole in said rubber plug. The screen employed was 100 mesh U.S. Sieve Series. A graduated cylinder was placed under the bottom valve to capture and hold any liquid which passed through the clay-containing mixture.

The sand column, a uniform mixture consisting of 45 grams of Oklahoma No. 1 sand, 4 grams of silica flour and 1 gram of A.P.I. bentonite, was prepared and placed on the screen in the interior of the aforementioned tube. The top of the tube was then closed, as indicated, the tube was vertically disposed, the bottom valve was closed and Liquid No. 1, as set out in Table 2A, below, was introduced into the tube in an amount sufficient to saturate the sand column maintained in the bottom of the tube with Liquid No. 1 and to provide a cushion of liquid to cover the top of the sand column to a depth of about 0.25 inch. A time of 60 minutes was permitted to elapse to assure the saturation of the sand column. About 10 ml of Liquid No. 1 was required to saturate the column and to provide the liquid cushion. Thereafter, the bottom valve was opened and liquids, in the sequence set out in Table 2A, below, were caused to pass through the tube from top to bottom under an air pressure of 7 psig Liquids passing through the tube were captured and maintained in the said graduated cylinder. The experiment was conducted at a temperature of 70 degrees Fahrenheit. The liquid cushion, as set out above, and, thus, the saturated condition of the sand column was maintained throughout the liquid sequence.

TABLE 2A

LIQUID SEQUENCE

| LIQUID No. | Liquid Name | Liquid Volume, ml |
|---|---|---|
| 1 | 596 NaCl | 250 |
| 2 | ADDITIVE | 100 |
| 3 | 5% NaCl | 250 |
| 4 | D.I. water | varied |

The additives employed, shown in Table 2B, below, were prepared by dissolving the indicated chemicals having the designated activities in deionized water. For example, Additive no. 1, shown to be a 2 percent by weight solution, can be prepared by dissolving 2 grams of 100% active potassium chloride in 98 grams of deionized water. Furthermore, Additive no. 8, shown to be a 0.20 percent by weight solution consisting of 36.44% active choline bicarbonate and 2.96% active potassium bicarbonate, can be prepared by dissolving 0.073 grams of choline bicarbonate and 0.006 grams of potassium bicarbonate in 99.921 grams of water. Accordingly, Additive no. 8 is an aqueous solution consisting of 0.079 percent total active material by weight of solution, wherein the Additive Enhancement Ratio, RE, the ratio of the enhancement ingredient, potassium bicarbonate, to the quaternary ammonium compound, choline bicarbonate, is about 0.08 to 1.

For purposes of clarity, it is noted that a fresh sand column as above described was employed for each Additive tested.

TABLE 2B

ADDITIVES EMPLOYED IN SAND COLUMNS

| Additive No. | Chemical name | activity, % | Concentration Weight % |
|---|---|---|---|
| 1 | KCl | 100.00 | 2.00 |
| 2 | TMACl | 33.00 | 0.20 |
| 3 | TMACl | 33.00 | 0.50 |
| 4 | ChBC | 37.50 | 0.20 |
| 5 | ChBC | 37.50 | 0.50 |
| 6 | ChBC | 36.15 | 0.20 |
|   | ABC | 3.75 |   |
| 7 | ChBC | 36.15 | 0.50 |
|   | ABC | 3.75 |   |
| 8 | ChBC | 36.44 | 0.20 |
|   | KBC | 2.96 |   |
| 9 | ChBC | 36.49 | 0.20 |
|   | AC | 2.84 |   |
| 10 | ChCl | 34.74 | 0.20 |
|   | ABC | 3.45 |   |
| 11 | ChCl | 34.74 | 0.50 |
|   | ABC | 3.45 |   |
| 12 | ABC | 100.00 | 1.00 |
| 13 | ABC | 100.00 | 2.00 |
| 14 | ChBC | 37.50 | 0.20 |
|   | ACl | 5.16 |   |
| 15 | ChBC | 37.50 | 0.0 |
|   | ACl | 5.16 |   |
| 16 | CaHx | 100.00 | 1.00 |
| 17 | CaHx | 100.00 | 2.00 |
| 18 | ChBC | 35.73 | 0.20 |
|   | NaBC | 3.75 |   |
| 19 | ChBC | 35.73 | 0.20 |
|   | NaC | 3.75 |   |

TABLE 2C

SAND COLUMN TESTS

| LIQUID #1 | LIQUID #2 | | LIQUID #3 | LIQUID #4 q1, ml/min, q2 | |
|---|---|---|---|---|---|
| Q1, ml/min | Add# | ml/min | Q2, ml/min | 1 min | 25 min |
| 20.64 | #1 | 26.29 | 26.92 | 24.25 | 12.52 |
| 13.17 | #2 | 5.20 | 5.19 | 7.25 | 2.85 |
| 13.86 | #3 | 4.98 | 5.81 | 8.07 | 4.67 |
| 13.49 | #4 | 3.50 | 5.87 | 9.50 | 3.37 |
| 22.39 | #5 | 7.57 | 11.46 | 9.70 | 6.25 |
| 12.17 | #6 | 3.07 | 4.77 | 5.43 | 1.47 |
| 16.51 | #7 | 8.94 | 14.67 | 13.20 | 8.80 |
| 29.66 | #8 | 3.98 | 11.81 | 8.80 | 3.70 |
| 22.28 | #9 | 13.25 | 13.28 | 15.80 | 10.80 |
| 24.51 | #10 | 6.65 | 12.27 | 14.45 | 10.47 |
| 12.90 | #11 | 2.92 | 4.63 | 6.40 | 1.43 |
| 17.62 | #12 | 14.91 | 14.92 | 15.78 | 5.52 |
| 17.08 | #13 | 16.02 | 15.16 | 13.50 | 5.23 |
| 15.83 | #14 | 5.75 | 6.71 | 8.87 | 3.92 |
| 13.68 | #15 | 4.30 | 5.08 | 3.41 | 1.27 |
| 11.49 | #16 | 7.63 | 9.92 | 10.80 | 7.92 |
| 9.96 | #17 | 4.48 | 4.43 | 8.80 | 7.09 |
| 18.80 | #18 | 5.80 | 7.19 | 9.00 | 4.21 |
| 12.63 | #19 | 4.07 | 5.58 | 8.80 | 2.96 |

TABLE 2D

ANALYSIS OF SAND COLUMN TESTS

| ADDITIVE | | Concentration | | | |
|---|---|---|---|---|---|
| No. | Name | % by weight | RE | RQ | Rq |
| 1 | KCl | 2.00 | 0.00 | −0.30 | 0.48 |
| 2 | TMACl | 0.066 | 0.00 | 0.61 | 0.61 |
| 3 | TMACl | 0.165 | 0.00 | 0.58 | 0.42 |
| 4 | ChBC | 0.075 | 0.00 | 0.56 | 0.65 |
| 5 | ChBC | 0.188 | 0.00 | 0.49 | 0.36 |
| 6 | ChBC | 0.072 | 0.11 | 0.61 | 0.73 |
|   | ABC | 0.008 |   |   |   |
| 7 | ChBC | 0.180 | 0.11 | 0.11 | 0.34 |
|   | ABC | 0.020 |   |   |   |
| 8 | ChBC | 0.073 | 0.08 | 0.60 | 0.58 |
|   | KBC | 0.006 |   |   |   |
| 9 | ChBC | 0.073 | 0.08 | 0.40 | 0.32 |
|   | AC | 0.006 |   |   |   |
| 10 | ChCl | 0.069 | 0.1 | 0.5 | 0.27 |
|   | ABC | 0.007 |   |   |   |
| 11 | ChCl | 0.174 | 0.1 | 0.64 | 0.78 |
|   | ABC | 0.017 |   |   |   |
| 12 | ABC | 1.0 | 0.00 | 0.15 | 0.65 |
| 13 | ABC | 2.0 | 0.00 | 0.11 | 0.61 |
| 14 | ChBC | 0.075 | 0.13 | 0.58 | 0.56 |
|   | ACl | 0.010 |   |   |   |
| 15 | ChBC | 0.188 | 0.14 | 0.63 | 0.63 |
|   | ACl | 0.026 |   |   |   |
| 16 | CaHx | 1.0 | 0.00 | 0.14 | 0.27 |
| 17 | CaHx | 2.0 | 0.00 | 0.56 | 0.19 |
| 18 | ChBC | 0.071 | 0.11 | 0.62 | 0.53 |
|   | NaBC | 0.008 |   |   |   |
| 19 | ChBC | 0.071 | 0.11 | 0.55 | 0.66 |
|   | NaC | 0.008 |   |   |   |

EXAMPLE 3

Liquids were passed through a Berea core plug vertically disposed and held in an A.P.I. fluid loss cell. The top of the cell was equipped to enable the introduction of liquid and gas into the interior thereof and for the maintenance of a uniform gas pressure therein. The bottom of the cell was equipped with a discharge stem and a valve. A graduated cylinder was placed under the bottom valve to capture and hold any liquid which passed through the Berea core plug.

The plug was prepared and placed in a brine solution, i.e. liquid no. 1, Table 2A, inside a vacumn chamber under vacumn for 60 minutes to saturate the plug with the brine. About 1 ml of brine was required to saturate the plug. Thereafter, the bottom valve was opened and liquids, in the sequence set out in Table 2A were caused to pass through the cell from top to bottom under an air pressure of 60 psig. Liquids passing through the cell were captured and maintained in the graduated cylinder. The experiment was conducted at a temperature of 70 degrees Fahrenheit. The saturated condition of the core was maintained throughout the liquid sequence.

The additives employed, shown in Table 3A, below, were prepared by dissolving the indicated chemicals having the designated activities in deionized water. The additives tested are identified by the additive numbers shown in Table 2B, above, and were prepared as described in Example 2.

For purposes of clarity, it is noted that a fresh Berea core plug as a bove described was employed for each additive tested.

TABLE 3A

ADDITIVES EMPLOYED IN CORE PLUGS

| Additive No. | Chemical name | activity, % | Concentration Weight % |
|---|---|---|---|
| 2 | TMACl | 33.00 | 0.20 |
| 3 | TMACl | 33.00 | 0.50 |
| 4 | ChBC | 37.50 | 0.20 |
| 5 | ChBC | 37.50 | 0.50 |
| 6 | ChBC | 36.15 | 0.20 |
|   | ABC | 3.75 |   |
| 7 | ChBC | 36.15 | 0.50 |
|   | ABC | 3.75 |   |
| 14 | ChBC | 37.50 | 0.20 |
|   | ACl | 5.16 |   |
| 15 | ChBC | 37.50 | 0.50 |
|   | ACl | 5.16 |   |

TABLE 3B

CORE PLUG TESTS

| LIQUID #1 Q1, ml/min | LIQUID #2 Add# | LIQUID #2 ml/min | LIQUID #3 Q2, ml/min | LIQUID #4 q1, ml/min, q2 1 min | LIQUID #4 25 min |
|---|---|---|---|---|---|
| 26.18 | #2 | 10.67 | 9.03 | 4.8 | 0.448 |
| 29.69 | #3 | 14.77 | 12.24 | 4.2 | 0.044 |
| 21.46 | #4 | 7.69 | 7.46 | 4.5 | 1.07 |
| 20.71 | #5 | 10.73 | 8.69 | 3.4 | 1.0 |
| 19.4 | #6 | 9.63 | 8.35 | 4.75 | 0.5 |
| 26.08 | #7 | 17.55 | 13.18 | 7.1 | 2.54 |
| 21.7 | #14 | 8.71 | 6.84 | 4.13 | 0.97 |
| 21.78 | #15 | 16.31 | 14.2 | 8.1 | 0.98 |

TABLE 3C

ANALYSIS OF CORE PLUG TESTS

| ADDITIVE No. | Name | Concentration % by weight | RE | RQ | Rq |
|---|---|---|---|---|---|
| 2 | TMACl | 0.066 | 0.00 | 0.66 | 0.91 |
| 3 | TMACl | 0.165 | 0.00 | 0.59 | 0.90 |
| 4 | ChBC | 0.075 | 0.00 | 0.65 | 0.76 |
| 5 | ChBC | 0.188 | 0.00 | 0.58 | 0.71 |

TABLE 3C-continued

ANALYSIS OF CORE PLUG TESTS

| ADDITIVE No. | Name | Concentration % by weight | RE | RQ | Rq |
|---|---|---|---|---|---|
| 6 | ChBC | 0.072 | 0.11 | 0.57 | 0.89 |
|   | ABC | 0.008 |   |   |   |
| 7 | ChBC | 0.180 | 0.11 | 0.49 | 0.64 |
|   | ABC | 0.020 |   |   |   |
| 14 | ChBC | 0.075 | 0.13 | 0.68 | 0.77 |
|   | ACl | 0.010 |   |   |   |
| 15 | ChBC | 0.188 | 0.14 | 0.35 | 0.88 |
|   | ACl | 0.026 |   |   |   |

Having described the invention, that which is claimed is:

1. A method of treating a clay-containing earthen formation comprising contacting said formation with an aqueous composition comprising water having dissolved therein an additive in an effective amount to substantially prevent permeability reduction of said clay-containing earthen formation as a result of contact between said formation and said aqueous composition, said additive being selected from the group consisting of a first compound and a blend comprising said first compound and a second compound wherein the weight ratio of said second compound to said first compound in said additive is an amount in the range of from about 0 to about 0.2 parts by weight said second compound per 1 part by weight said first compound;

said first compound is a quaternary ammonium compound represented by the general formula

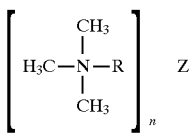

wherein, R is represented by the formula

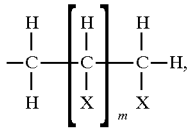

Z is selected from the group consisting of $CO_3$ and $HCO_3$, X is selected from the group consisting of H, OH and mixtures thereof, wherein at least one X is OH, m is 0 or 1, and n is 1 or 2;

said second compound is represented by the general formula $$B_d F,$$

wherein, component B is selected from the group consisting of $NH_4$, K and Na, component F is selected from the group consisting of $CO_3$, $HCO_3$ and Cl and d is 1 or 2.

2. The method of claim 1 wherein said effective amount of said additive is an amount in the range of from about 0.004 to about 0.4 percent additive by weight of said aqueous composition.

3. The method of claim 2 wherein said weight ratio of said second compound to said first compound in said composition is 0.

4. The method of claim 3 wherein n is 1.

5. The method of claim 4 wherein said first compound is selected from the group consisting of (2-hydroxyethyl)

trimethyl ammonium bicarbonate, (2-hydroxypropyl) trimethyl ammonium bicarbonate, (3-hydroxypropyl) trimethyl ammonium bicarbonate and (2,3-dihydroxypropyl)trimethyl ammonium bicarbonate.

6. The method of claim 4 wherein m is 0.

7. The method of claim 5 wherein said first compound is (2-hydroxyethyl)trimethyl ammonium bicarbonate present in said aqueous composition in an amount in the range of from about 0.06 to about 0.1 percent by weight of said aqueous composition.

8. The method of claim 2 wherein said component F in said second compound is selected from the group consisting of $CO_3$ and $HCO_3$.

9. The method of claim 1 wherein said clay-containing earthen formation is a subterranean formation.

10. The method of claim 9 wherein said component F in said second compound is selected from the group consisting of $CO_3$ and $HCO_3$, said weight ratio of said second compound to said first compound in said additive is an amount in the range of from about 0.01 to about 0.15 and said effective amount of said additive is an amount in the range of from about 0.06 to about 0.1 percent additive by weight of said aqueous composition.

11. The method of claim 10 wherein said first compound is (2-hydroxyethyl)trimethyl ammonium bicarbonate, said second compound is ammonium bicarbonate, said weight ratio of said second compound to said first compound in said additive is about 0.1 parts by weight of said second compound per 1 part by weight of said first compound and said additive is present in said aqueous composition in an amount of about 0.08 percent additive by weight of said aqueous composition.

12. A method of stimulating the production of hydrocarbons from a clay-containing subterranean formation comprising contacting said formation with an aqueous composition under conditions sufficient to create at least one fracture in said formation to thereby stimulate the production of hydrocarbons from said formation;

wherein said aqueous composition is comprised of water having dissolved therein an additive in an effective amount to substantially prevent permeability reduction of said clay-containing earthen formation as a result of contact between said formation and said aqueous composition, said additive being selected from the group consisting of a first compound and a blend comprising said first compound and a second compound wherein the weight ratio of said second compound to said first compound in said additive is an amount in the range of from about 0 to about 0.2 parts by weight said second compound per 1 part by weight said first compound;

said first compound is a quaternary ammonium compound represented by the general formula

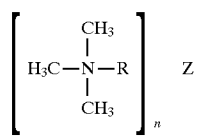

wherein, R is represented by the formula

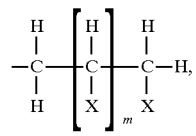

Z is selected from the group consisting of $CO_3$ and $HCO_3$, X is selected from the group consisting of H, OH and mixtures thereof, wherein at least one X is OH, m is 0 or 1, and n is 1 or 2;

said second compound is represented by the general formula $B_dF$, wherein, component B is selected from the group consisting of $NH_4$, K and Na, component F is selected from the group consisting of $CO_3$, $HCO_3$ and Cl and d is 1 or 2.

13. The method of claim 12 wherein said weight ratio of said second compound to said first compound in said additive is an amount in the range of from about 0.01 to about 0.15 and said effective amount of said additive is an amount in the range of from about 0.06 to about 0.1 percent additive by weight of said aqueous composition.

14. The method of claim 13 wherein said first compound is (2-hydroxyethyl)trimethyl ammonium bicarbonate, said second compound is ammonium bicarbonate, said weight ratio of said second compound to said first compound in said additive is about 0.1 parts by weight of said second compound per 1 part by weight of said first compound and said additive is present in said aqueous composition in an amount of about 0.08 percent additive by weight of said aqueous composition.

15. An additive for an aqueous composition useful to treat a clay-containing formation, said additive being comprised of a blend of a first compound and a second compound wherein the weight ratio of said second compound to said first compound in said additive is an amount in the range of from about 0.01 to about 0.15 parts by weight said second compound per 1 part by weight said first compound;

said first compound is a quaternary ammonium compound represented by the general formula

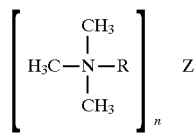

wherein, R is represented by the formula

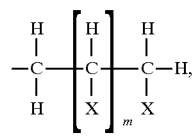

Z is selected from the group consisting of $CO_3$ and $HCO_3$, X is selected from the group consisting of H, OH and mixtures thereof, wherein at least one X is OH, m is 0 or 1, and n is 1 or 2;

said second compound is represented by the general formula $B_dF$, wherein, component B is selected from the group consisting of $NH_4$, K and Na, component F is selected from the group consisting of $CO_3$, $HCO_3$ and Cl and d is 1 or 2.

16. The additive of claim 15 wherein said component F in said second compound is selected from the group consisting of $CO_3$ and $HCO_3$.

17. The additive of claim 16 wherein n is 1.

18. The additive of claim 17 wherein said first compound is selected from the group consisting of (2-hydroxyethyl) trimethyl ammonium bicarbonate, (2-hydroxypropyl) trimethyl ammonium bicarbonate, (3-hydroxypropyl) trimethyl ammonium bicarbonate and (2,3-dihydroxypropyl)trimethyl ammonium bicarbonate.

19. The additive of claim 18 wherein said first compound is (2-hydroxyethyl)trimethyl ammonium bicarbonate, said second compound is ammonium bicarbonate and said weight ratio of said second compound to said first compound in said additive is about 0.1 parts by weight of said second compound per 1 part by weight of said first compound.

20. An aqueous composition comprising water having dissolved therein the additive of claim 19 wherein said additive is present in said aqueous composition in an amount of about 0.08 percent of said additive by weight of said aqueous composition.

* * * * *